United States Patent [19]

Dawson

[11] 4,073,944
[45] Feb. 14, 1978

[54] NOZZLE SHUT-OFF VALVE

[75] Inventor: James Earl Dawson, Lebanon, Ohio

[73] Assignee: Cincinnati Milacron Inc., Cincinnati, Ohio

[21] Appl. No.: 702,481

[22] Filed: July 6, 1976

[51] Int. Cl.² ............................................. B29F 1/03
[52] U.S. Cl. ................................... 425/146; 137/494;
425/562; 425/DIG. 225
[58] Field of Search ... 425/245 R, 245 NS, DIG. 224,
425/225, 229, 562, 563; 435/146; 137/538, 494

[56] References Cited

U.S. PATENT DOCUMENTS

| 3,097,396 | 7/1963 | Ludwig | 425/DIG. 224 |
| 3,270,115 | 8/1966 | Nouel | 425/DIG. 225 |
| 3,338,263 | 8/1967 | Alfmeppen | 137/538 X |
| 3,354,507 | 11/1967 | Orrevad | 137/538 X |
| 3,526,929 | 9/1970 | Coupland | 425/245 X |
| 3,690,797 | 9/1972 | Garner | 425/146 |

FOREIGN PATENT DOCUMENTS 42,776   1/1966   Germany ................. 425/245 NS

Primary Examiner—Francis S. Husar
Assistant Examiner—William R. Briggs
Attorney, Agent, or Firm—Daniel P. Worth

[57] ABSTRACT

A nozzle shut-off valve for an injection molding machine has a plunger mounted to reciprocate in a bore so as to block the passageway of the plastic through the nozzle, a single-acting pneumatic piston and cylinder to reciprocate the plunger, to block said passageway, and a pilot passage connecting the underside of the plunger to a location upstream of the intersection of the bore and the passageway for plastic through the nozzle.

12 Claims, 3 Drawing Figures

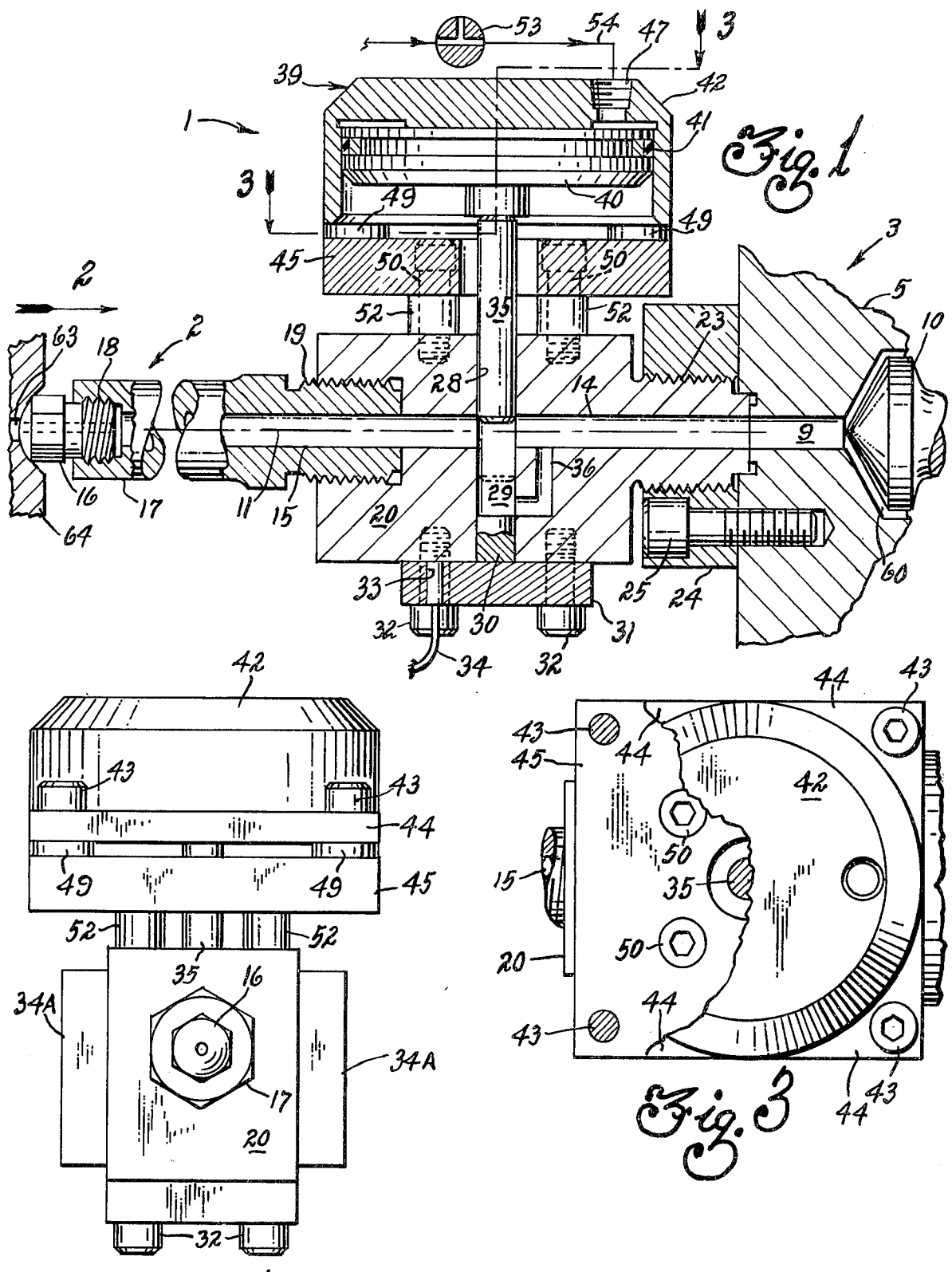

NOZZLE SHUT-OFF VALVE

SUMMARY AND BACKGROUND OF THE INVENTION

The present invention provides an improved nozzle shut-off valve for use in an injection molding machine for plastic. One aspect of the invention relates to an improved nozzle shut-off valve having a pilot passage so located as to assist in opening the shut-off valve with the pressure of plastic from or in the injection unit. An aspect relates to an improved nozzle shut-off valve for use in reciprocating screw or plunger type injection molding machines of the kind used to handle plastic and elastomeric material.

Conventional molding apparatus of the reciprocating rotating screw type usually includes a plasticizing cylinder or chamber having a bore, wherein the plasticizing screw rotates in such a manner so as to allow the solid molding material to enter the cylinder and be plasticized as it advances in the direction of screw feed. Attached on one end of the plasticizing cylinder is a nozzle in communication with a mold sprue which leads to the mold cavity. As the plasticized material is deposited at the metering or front end of the screw, it develops a back pressure that forces the screw to retract in the cylinder bore and when the plasticized material reaches a predetermined volume, or shot size, the retracting screw contacts a limit switch and stops its rotation. The shot is now ready for injection into the mold cavity, generally upon receipt of a signal from the clamp, whereupon the screw is driven forward hydraulically to inject the shot. Later, the plasticizing screw again starts to rotate and gradually retract as a new shot is built up in the plasticizing cylinder. Thus, the screw reciprocates once per machine cycle to plasticize and inject a shot of material.

Often, a shut-off valve is employed to interrupt the flow of molten material from the nozzle into the mold sprue. The valve offers the advantages of minimizing or entirely curtailing drool through cut off of material flow at the nozzle and provide the capability to plasticize during periods in which the mold is open. Generally, plasticizing takes place during part curing to prevent plasticized material from escaping.

Over the years many types of shut-off devices and means to actuate them have been developed and utilized with varying degrees of success. Included among these are, for example, spring operated needle valves such as shown in FIG. 4 of U.S. Pat. No. 3,002,229, which are generally not completely reliable in actual operation; mechanically operated pin valves such as shown in U.S. Pat. No. 3,172,161 which are generally difficult to properly align and have multiple pivot points subject to wear; hydraulically operated rotary valves such as shown in FIG. 3, of U.S. Pat. No. 3,169,275 which are often subject to scoring and difficult to locate near the nozzle because of high nozzle temperatures which make hydraulic operation hazardous; and hydraulically operated piston valves such as shown in FIG. 3 of U.S. Pat. No. 3,026,567 which again are difficult to locate near the nozzle due to the high nozzle temperatures involved.

A preferred embodiment of the present invention employs as drive means a pneumatic motor, thus eliminating the danger of lubricating and hydraulic liquids in this high temperature environment.

Substantial force is necessary to open a nozzle shut-off valve preparatory to an injection cycle. Prior art devices provided this by various arrangements of hydraulic motor, pneumatic piston and cylinder arrangements, and the location and orientation of the several parts.

The present invention facilitates opening and reduces the size of the fluid motor used to open same through the agency of a carefully located pilot passageway that allows the pressure of the plastic itself to open the valve preparatory to an injection operation. The preferred embodiment so locates the passage that it is self-cleaning because plastic can flow through it from one end to the other.

Thus, the present invention contemplates a nozzle shut-off device for use in combination with the nozzle of an injection unit of a plastic injection molding machine, the nozzle having therethrough a substantially straight axial first passageway that is substantially coaxial with the exit passage from said injection unit, which device comprises a body member for interposing between said nozzle and said injection unit and having therethrough a shut-off passageway that is substantially straight and substantially coaxial with said first passageway; a lateral bore in said body intersecting said shut-off passageway and defining a pilot chamber on one side of said shut-off passageway; a plunger reciprocably mounted in said bore and of a cross-section to substantially completely block the following: said shut-off passageway when placed thereacross, said lateral bore, and said pilot chamber, and having a length sufficient when advanced fully to extend across said shut-off passageway into said pilot chamber thereby to block the shut-off passageway; and when fully withdrawn to substantially unblock said shut-off passage; a pilot passage formed in said body and establishing communication between a location under the end of said plunger when same is advanced into said pilot chamber and upstream of the intersection of said bore with said shut-off passageway.

Many prior art constructions present alignment and seal problems because the shut-off valve element is connected to the drive means and both have to be aligned simultaneously during assembly. The present invention eliminates these categories of problems by providing a floating engagement between the valve element (herein a plunger) and the drive means that works when either is pushed into engagement with the other but does not resist pulling the plunger and drive apart.

Other features and advantages of the present invention should be apparent by reference to the following specification and drawings wherein:

FIG. 1 is a side cross-section view of a nozzle shut-off device according to the invention which is interposed between the nozzle and the plasticizing cylinder;

FIG. 2 is a front view of the nozzle shut-off valve assembly of FIG. 1;

FIG. 3 is a section view taken along 3—3 of FIG. 1; and

The drawings show a nozzle shut-off valve 1 according to the invention interposed between a nozzle 2 and the combined plastication-injection unit 3 of an injection molding machine. The plastication unit has a well-known structure that terminates in a cylinder end cap 5 which is bolted by bolts or cap screws (not shown) to the end of the barrel and has therethrough a central axial passage 9. A plastication screw 10 is mounted in the barrel and can both rotate and reciprocate therein. The axis 11 for the passage extends not only through the cylinder end cap 5 but also through the nozzle and the shut-off valve in a substantially straight line. There are a series of passageways defining the plastic flow path beginning with the central axial passage 9, followed by a shut-off passageway 14 through the shut-off valve and then a nozzle passage 15.

In the illustrated embodiment the nozzle 2 is shown as an assembly of a nozzle tip 16 and nozzle body 17 although it is to be understood that a one-piece nozzle of appropriate length and size could be used. Heater bands and thermocouples to control them are supplied as needed to the nozzle, cylinder end cap, and nozzle barrel. Suitable threaded connections 18, 19 fixedly secure the nozzle tip to the nozzle body and further fixedly secure the nozzle body into the downstream end of the shut-off valve body 20 which will be further described below.

The shut-off valve is an assembly of a number of components including a valve body 20 having therethrough the shut-off passageway 14 which, as already noted, is substantially coaxial with the central passage in the cylinder end cap. The upstream end of the valve body has an externally threaded connection member 23 that threadably engages the adapter 24 which in turn is mounted by a plurality of bolts 25 to the cylinder end cap.

A lateral bore 28 is located in said body to intersect, preferably substantially perpendicularly, the shut-off passageway and to define at one end of the bore a pilot chamber 29 disposed on one side of the shut-off passageway. The bore 28 section on the opposite side of the passageway 14 from the pilot chamber slidably receives and supports the plunger 35. The pilot chamber is further defined by a plug 30 and a closure cap 31 which cap is bolted to the bottomside of the body by a plurality of bolts 32. A thermocouple well 33 is formed in closure cap 31 for a thermocouple 34 which is used to control body heat band 34A. Use of this construction facilitates manufacture in that the bore can be drilled completely through the body, likewise the pilot passage, without the problems of drilling and deburring a blind hole.

A plunger 35 is reciprocably mounted in the bore 28 and has a cross-section sufficient to completely block the shut-off passageway 14 at the location where the bore and passageway intersects. Minimum clearance for permitting reciprocation of the plunger is provided so that leakage along the bore will be minimized. The plunger cross-section is also sufficient to block the upper end of the pilot chamber 29 when the plunger is inserted therein. The plunger has a length and is reciprocated through a stroke sufficient to block the upper end of the pilot chamber as shown in dotted lines in FIG. 1 and thereby to block the shut-off passage but yet to open the shut-off passage when retracted to the solid line position of FIG. 1.

A pilot passage 36 is formed in the body and establishes communication between the pilot chamber and a point upstream of the aforesaid bore-passageway intersection. The pilot passage permits the flow of plastic material through itself into the pilot chamber and the application of the pressure of the plastic material to the end of the plunger when same is located in the pilot chamber. The pilot passage may be formed in a convenient manner by drilling intersecting holes from the outside of the valve body into the pilot chamber and passageway, respectively, closing each hole with a threaded connector such as a pipe plug. If desired, plugs like 30 can be inserted in the outboard volumes of such pilot passage drillings.

Superimposed on the valve body is a single acting pneumatic piston-cylinder assembly 39 acting as drive means for the plunger 35. Due to the size of the piston 40, I prefer to describe this as a poppet type shut-off valve.

The plunger 35 is engaged by but is not screwed or otherwise secured to the underside of the piston 40: this minimizes alignment problems when assembling the valve. The piston 40 preferably has piston rings 41 and in turn is reciprocably fitted into the pneumatic cylinder cap 42. The cylinder cap is bolted by cap screws 43 through lugs 44 to the cylinder base 45. The cap has a suitable air passage 47 for inlet and outlet air to the top of the piston. An insulating spacer 49 preferably of a high softening point (1000° F) polyamide, is betwween the cap and the cylinder base. Alternatively, the piston ring may be of graphite carbon or the cap 42 can be lined with a carbon brushing.

The piston-cylinder assembly is mounted by a plurality of bolts 50 to the valve body 20 from which it is spaced by a hollow cylindrical spacer 52 through which each bolt 50 passes.

Air is admitted and exhausted from single acting cylinder assembly 39 by manipulating three-way valve 53 in well-known fashion to accomplish these functions. The valve 53 and associated piping are shown schematically.

A typical cycle of operation for injection molding assumes the shut-off valve 1 has been moved to the dotted line position of FIG. 1 where it blocks the shut-off passageway 14. Air pressure is maintained on top of the piston 40 to hold the valve (plunger 35) shut. This is accomplished by admitting a sufficient quantity of air through the inlet port 47 of the cylinder 42 so as to drive the piston 40 and plunger 35 down to said dotted line position. Shortly thereafter the screw 10 is rotated by suitable conventional power means which are not shown herein. As the screw 10 rotates, plastic is brought to a molten condition and accumulates downstream of the screw at 60. As can be seen, the pilot chamber 29, pilot passageway 36, and points upstream thereof (e.g., 14, 9) are in full pressure communication with the plastic which accumulates at 60 ahead of the screw. When the proper quantity of plastic is accumulated downstream of the screw — to the left as seen in FIG. 1 — the system stops rotating the screw 10 and then, in well-known manner, to drive the screw to the left as seen in FIG. 1 which immediately applies pressure to the mass of plastic accumulated downstream of the screw.

At this point in time, it is desired to open the shut-off valve because it has kept the shut-off passageway 14 closed during that portion of the cycle already described. This is done by exhausting the air from on top of the piston 40 and by causing the screw to move to the left as already mentioned. This in turn builds up tremendous hydraulic pressure in the mass of plastic material accumulated to the left of the screw (9, 14, 36, 29) as seen in FIG. 1 and most particularly applies this pressure to the pilot passage 36 and pilot chamber 29 and on the bottom of plunger 35. This application of pressure is suffcient to force the plunger up to the solid line position of FIG. 1 whereupon the shut-off passageway 14 is open and the injection of plastic into the spruce 63 of the mold 64 commences. The shut-off passageway 14 is blocked a short time later by the application of compressed air or other pneumatic material via 53,54 to the top side of the piston 40. The cycle then repeats itself.

It will be appreciated that the plunger 35 may be made of hardened steel stock having a substantially cylindrical shape and size to slidably fit within the bore, and in its preferred embodiment has a substantially constant diameter. Arranged serially along its length it has a pilot region that slidably fits within that portion of the bore forming the pilot chamber, 29, an engaging region at the other end which extends along the bore to outside the body 20 to a place where it floatingly engages the piston 40, and intermediate the foregoing two regions has a blocking region of a diameter or size sufficient to block the shut-off passageway 14 when placed thereacross (i.e., when advanced to the dotted line position of FIG. 1). The floating engagement with the piston 40 permits relative lateral motion should the two not be exactly coaxial while at the same time not permitting the transfer of tensile force between the two along the axis of plunger 35.

I claim:

1. A nozzle shut-off device for use in combination with and at a location between the nozzle and the plastication injection unit of a plastic injection molding machine, the nozzle having therethrough a substantially straight first passageway that is substantially coaxial with the exit passage from said plastication injection unit, said nozzle communicating with a mold cavity, which shut-off device comprises:

a body member for fixedly securing to and interposing between such nozzle and such injection unit and having therethrough a shut-off passageway that is substantially straight;

a lateral bore in said body intersecting said shut-off passageway, defining a pilot chamber on one side of said shut-off passageway and defining on the opposite side of said shut-off passageway a bore section in which the hereinafter said plunger is reciprocably supported;

a laterally extending plunger reciprocably mounted in said bore and of a cross-section to substantially completely block the following: said shut-off passageway when placed laterally thereacross, said lateral bore, and said pilot chamber, and having a length sufficient when advanced laterally fully to extend across said shut-off passageway into said pilot chamber thereby to block said shut-off passageway; and when fully withdrawn to substantially unblock said shut-off passage;

a pilot passage extending within said body between said pilot chamber and said shut-off passageway at a location that is upstream of the intersection of said bore with said shut-off passageway to establish communication between said upstream location and a region in said pilot chamber that is under the end of said plunger when the plunger is advanced into said pilot chamber sufficient to block said shut-off passageway.

2. A nozzle shut-off device according to claim 1, further comprising drive means to drive said plunger into said pilot chamber at which time said shut-off passageway is substantially completely blocked by said plunger.

3. A nozzle shut-off device according to claim 2, wherein said drive means comprises a pneumatic piston and cylinder the piston being engaged by to one end of said plunger to reciprocate said plunger.

4. A nozzle shut-off device according to claim 2, wherein said drive means comprises a piston and cylinder the piston being engaged by one end of said plunger to reciprocate said plunger.

5. A nozzle shut-off device according to claim 2, wherein said drive means comprises a piston and cylinder located at the opposite end of said lateral bore from said pilot chamber, one end of said plunger engaging one side of said piston with a floating connection which permits relative lateral motion between said piston and plunger but does not transmit tension between the two.

6. A nozzle shut-off device according to claim 1, wherein said lateral bore is substantially perpendicular to said shut-off passage.

7. A nozzle shut-off device according to claim 4, further comprising valve means for admitting and exhausting pneumatic fluid to one side of said piston.

8. In an apparatus according to claim 1, the further improvement comprising a floating connection between said piston and said plunger which permits relative lateral motion between said piston and plunger but does not transmit tension between the two, and wherein said plunger has a substantially cylindrical shape having at one end a pilot region that slidably fits in said pilot chamber of said bore when the plunger is advanced thereinto, a blocking region intermediately located and of a size to block said shut-off passageway when moved thereacross and when said pilot region is within the last said bore portion, and an engaging region at the other end that extends from said blocking region substantially coaxially along said bore to without said body and into engagement with said piston.

9. In an injection molding apparatus comprising a chamber having a nozzle attached near one end thereof, means for forcing molten material from said chamber through a passageway formed in said nozzle, a mold having a sprue formed therein, which sprue is in communication with the passageway formed in said nozzle, and a nozzle shut-off device interposed between said nozzle and said chamber the improvement comprising:

a body member fixedly secured to and interposed between said nozzle and said injection unit and having therethrough a shut-off passageway that is substantially straight and substantially coaxial with said first passageway;

a lateral bore in said body intersecting said shut off passageway, defining a pilot chamber on one side of said shut-off passageway and defining on the opposite side of said passageway a bore section in which the hereinafter said plunger is reciprocably supported;

a plunger reciprocally mounted in said bore and having at one end a pilot region, at the other end an engaging region, and a blocking region intermediately located between said pilot and engaging region, said pilot region having a cross-section to substantially block but slidably fit within said pilot chamber, said blocking region having a cross-section sufficient in size to block said shut-off passageway when moved thereacross to dispose said pilot region within said pilot chamber, said engaging region having a length sufficient to extend from said blocking region substantially coaxially along said bore to without said body, said plunger having a length sufficient when reciprocated to extend across said shut-off passageway into said pilot chamber;

a pilot passage extending within said body between said pilot chamber and said shut-off passageway at a location that is upstream of the intersection of said bore with said shut-off passsageway to establish communication between said upstream location and a region in said pilot chamber that is under the end of said plunger when the plunger is advanced into said pilot chamber sufficient to block said shut-off passageway.

10. In an apparatus having the improvement according to claim 9, the further improvement comprising drive means to drive said plunger from said pilot chamber at which time said shut-off passage is substantially completely blocked by said plunger.

11. In an apparatus according to claim 10, the further improvement wherein said drive means comprises a pneumatic piston and cylinder connected to one end of said plunger to reciprocate said plunger.

12. In an apparatus according to claim 11, the further improvement comprising a floating connection between said piston and said plunger which permits relative lateral motion between said piston and plunger but does not transmit tension between the two, and wherein said plunger has a substantially cylindrical shape having at one end a pilot region that slidably fits in said pilot chamber of said bore when the plunger is advanced thereinto, a blocking region intermediately located and of a size to block said shut-off passageway when moved thereacross and when said pilot region is within the last said bore portion, and an engaging region at the other end that extends from said blocking region substantially coaxially along said bore to without said body and into engagement with said piston.

* * * * *